United States Patent [19]

Bloomfield

[11] 4,369,630
[45] Jan. 25, 1983

[54] COMBINATION DRIVE SYSTEM FOR SHIPS

[75] Inventor: Warren Bloomfield, Norwalk, Conn.

[73] Assignee: Avco Corporation, Stratford, Conn.

[21] Appl. No.: 235,956

[22] Filed: Feb. 19, 1981

[51] Int. Cl.³ .............................................. F02B 73/00
[52] U.S. Cl. ...................................... 60/718; 60/716; 440/3; 440/88
[58] Field of Search ................. 60/716, 717, 718, 726, 60/709; 440/3, 4, 88

[56] References Cited

U.S. PATENT DOCUMENTS

| | | | |
|---|---|---|---|
| 2,576,814 | 11/1951 | Stalker | 440/88 |
| 2,723,531 | 11/1955 | Wosika et al. | 60/718 |
| 3,601,980 | 8/1971 | Faber | 60/717 |
| 3,820,338 | 6/1974 | Hiersig et al. | 60/718 |
| 3,826,218 | 7/1974 | Hiersig et al. | 60/718 |
| 4,153,002 | 5/1979 | Sigg | 440/3 |
| 4,182,127 | 1/1980 | Johnson | 60/618 |

Primary Examiner—A. Michael Chambers
Attorney, Agent, or Firm—Ralph D. Gelling

[57] ABSTRACT

A drive system is disclosed for increasing the total output power from a main driving and gas turbine engine combination. The subject drive system is particularly suitable for use in ships which include both a main driving engine such as a diesel or small turbine, having high efficiency at low power outputs, and a gas turbine engine, for high power outputs. In accordance with the subject invention, in order to obtain the maximum total power from both engines, the main driving engine is coupled to a compressor for supercharging air prior to its introduction into the gas turbine engine. The resulting horsepower generated by the supercharged gas turbine engine is greater than the sum of the horsepower of each individual engine.

4 Claims, 3 Drawing Figures

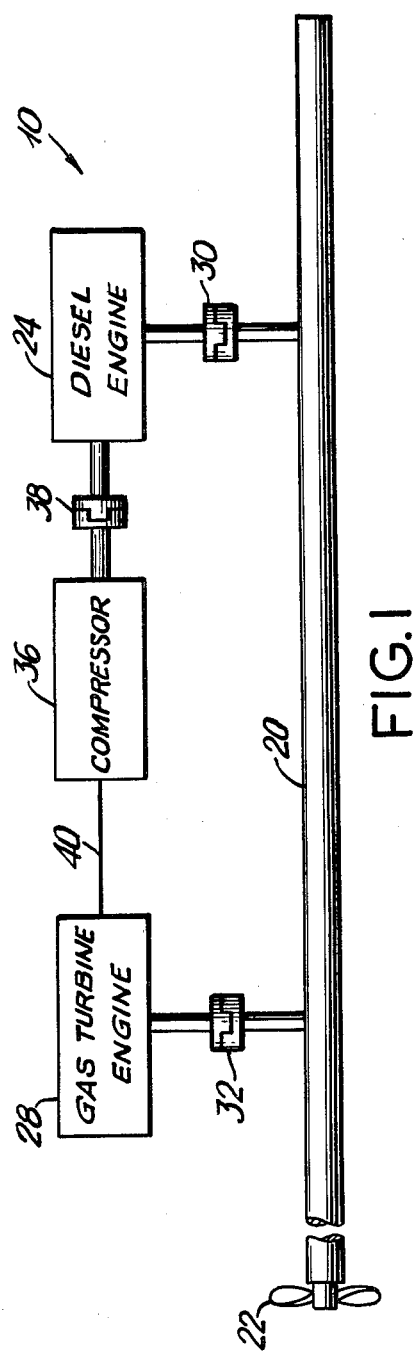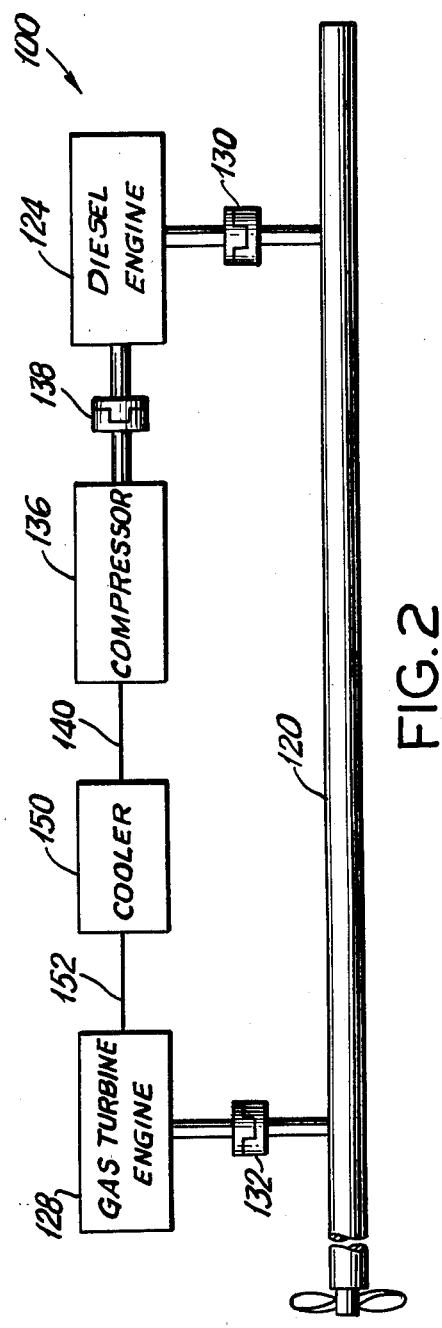

COMBINATION DRIVE SYSTEM FOR SHIPS

BACKGROUND OF THE INVENTION

The subject invention relates to a new and improved drive system which is particularly adapted for use in ships which includes a main driving engine having high efficiency at low power, in combination with a high power gas turbine engine. In accordance with the subject invention, the total power output generated by the engine combination is increased by using the main driving engine to run a compressor for supercharging the gas turbine engine. The resulting power generated by the supercharged gas turbine engine is greater than the sum of the powers generated by the turbine and main driving engines individually.

In the prior art, the selection of a drive system for a particular craft is dependent on various factors such as efficiency and power requirements, as well as the relative size and weight of the drive system and craft. In combat vehicles such as tanks, ships, and more specifically, patrol boats, it is desirable to provide a drive system which is both fuel efficient at low power, for long range cruising operations, and also capable of generating high power for short periods of time. More specifically, a patrol boat is generally required to spend a significant amount of time cruising at low speeds, on the order of 15 knots. Since a patrol boat is often away from its base for weeks at a time, a main engine drive which is efficient at low power is necessary. Typically, a large diesel engine, which may weight up to ten tons, is selected since it is fuel efficient at low power, and weight is not a critical restrictive factor on a ship. In the alternative, a small gas turbine engine is used for cruising speeds. As can be appreciated, however, situations arise when the patrol boat must travel at considerably higher speeds, on the order of 40 to 50 knots. An additional engine is required which can produce power 3 to 5 times greater than the diesel engine. To satisfy the latter requirements, a high power gas turbine engine is usually chosen. While a gas turbine engine is inefficient at low power outputs, it can generate the high power output necessary for combat conditions.

Accordingly, in the prior art, patrol boats have been provided with drive system combinations which include both a main driving diesel engine and a high power gas turbine engine. One example of this type of prior art combination drive system, as used in ships, can be found in U.S. Pat. No. 3,826,218, issued July 30, 1974 to Hiersig et al.

The prior art combination drive systems generally fall into two main catagories. The first is the Combined Diesel or Gas Turbine Engine System identified by the acronym "CODOG" which is designed such that power is transmitted to the propeller shaft by either the diesel engine or the gas turbine engine. More specifically, coupling arrangements are provided such that at slow cruising speed, the fuel efficient diesel engine is coupled to the propeller shaft, while the gas turbine engine is disengaged. In contrast, when high power is required for combat speeds, the diesel engine is disengaged from the propeller shaft and the gas turbine engine is coupled thereto instead. As can be appreciated, the maximum power which may be delivered to the shaft, at one time in a CODOG system, is equivalent to the maximum power output of the gas turbine engine.

In order to increase the maximum power output delivered to the shaft, an improved system was developed in the prior art called the Combined Diesel and Gas Turbine Engine System, identified by the acronym CODAG. In the latter CODAG systems, low cruising speeds are obtained by coupling only the fuel efficient diesel engine to the shaft. At higher speeds, the diesel engine is disengaged from the shaft, and the gas turbine engine is coupled thereto instead. Thus, at low and middle speed ranges the CODAG system resembles the CODOG system. However, when maximum combat speed is required in the CODAG system, the output of both the diesel and the gas turbine engines are coupled to the propeller shaft. By this arrangement, the maximum total power which is delivered to the shaft is equal to the sum of the horsepower generated by both the diesel and the gas turbine engines. Thus, compared to the CODOG system, where the maximum power which can be delivered to the shaft is equal to the power output of the gas turbine engine, a CODAG drive system permits the output of both engines to be coupled to the shaft simultaneously.

Other similar systems have been developed wherein both engines are gas turbines, with the main driving turbine being considerably smaller than the high power turbine. The advantage of using two turbines is that a small turbine operating at maximum capability is more fuel efficient than a large unit operating at low power output. Analagous drive systems have been developed wherein either or both engines can be coupled to the output shaft and are identified by the acronyms COGOG and COGAG, respectively.

In order to achieve the coupling of both engines to the shaft in a CODAG or COGAG system, it is necessary to provide a complex gearing and clutch arrangement. More particularly, a major shortcoming of the combined systems is that since the main driving and gas turbine engines operate in a different manner, at different speeds, sophisticated, synchronized linkage arrangements are required to simultaneously couple both engine outputs to the drive shaft. One example of such a synchronized clutch arrangement can be found in the above cited U.S. Pat. No. 3,826,218. It is apparent that even with its shortcomings, the development of the prior art combined drive systems demonstrate the desirability of providing a drive system wherein power delivered to the output shaft is maximized.

Accordingly, it is an object of the subject invention to provide a new and improved drive system wherein the total horsepower delivered to the shaft is greater than the sum of the horsepower of each individual engine.

It is a further object of the subject invention to provide a new and improved drive system wherein maximum horsepower is achieved by using the main driving engine to drive a compressor for supercharging the gas turbine engine thereby boosting its horsepower output an amount greater than the output of the main driving engine alone.

It is another object of the subject invention to provide a new and improved drive system for use with a diesel and gas turbine engine combination which does not require the use of complex synchronized linkage and clutch arrangements utilized to the prior art to couple both engines to the shaft at the same time for achieving maximum power.

It is still a further object of the subject invention to provide a new and improved drive system wherein precompressed air is cooled prior to delivery to the gas turbine engine for further increasing the power output of the turbine engine.

SUMMARY OF THE INVENTION

In accordance with these and many other objects, the subject invention provides for a new and improved drive system for supplying power to a shaft. The drive system includes a main driving engine, such as a diesel, which is capable of generating a low power output at high fuel efficiency. The main driving engine is detachably coupled to the shaft. The subject combination further includes an accelerated driving engine which includes a gas turbine engine capable of generating high power outputs that is detachably coupled to the shaft.

In accordance with the subject invention, a compressor is provided which is detachably coupled to the main driving engine. The output of the compressor is channeled to the input of the accelerated driving engine for supercharging the gas turbine engine.

In use, when cruising speeds are desired, similar to the prior art systems, only the main driving engine is coupled to the propeller shaft. When increased power requirements are necessary, the main driving engine is disengaged from the shaft and the gas turbine engine is engaged instead. In accordance with the subject invention, when maximum total output power is required, the main driving engine is utilized to run a compressor for pre-compressing or supercharging the air prior to its entry into the gas turbine engine. The increase in horsepower of the gas turbine engine resulting from the supercharging effect is greater than the horsepower of the main driving engine. Thus, the drive system of the subject invention is capable of producing a total output power which is greater than the sum of the output powers of each individual engine. Further, complex clutch mechanisms, which were required in the prior art to couple both engines to the shaft simultaneously, are unnecessary since the total output power is being generated by the gas turbine engine alone.

In an alternate embodiment of the subject invention, total output power from the gas turbine engine is further increased by providing a cooling means between the compressor and the gas turbine engine. More specifically, it is known that cooling air prior to its entry into a gas turbine engine increases its density, which in turn, increases the mass flow through the turbine thereby increasing generated horsepower. Since the subject invention is intended mainly for use in marine vessels, sea water provides a readily available and low cost source of cooling. Therefore, in accordance with the second embodiment of the subject invention, the pre-compressed air from the compressor is cooled prior to its entry into the gas turbine thereby increasing the density of air. The combination of the supercharging compressor and the cooling of the air, dramatically increases the mass flow through the gas turbine engine to obtain maximum power output therefrom.

Further objects and advantages of the subject invention will become apparent from the detailed description when taken in conjunction with the following drawings in which:

BRIEF DESCRIPTION OF THE DRAWINGS

FIG. 1 is a schematic diagram illustrating the first embodiment of the new and improved drive system of the subject invention.

FIG. 2 is a schematic diagram illustrating the second embodiment of the new and improved drive system of the subject invention.

DESCRIPTION OF THE PREFERRED EMBODIMENT

Figure 3:
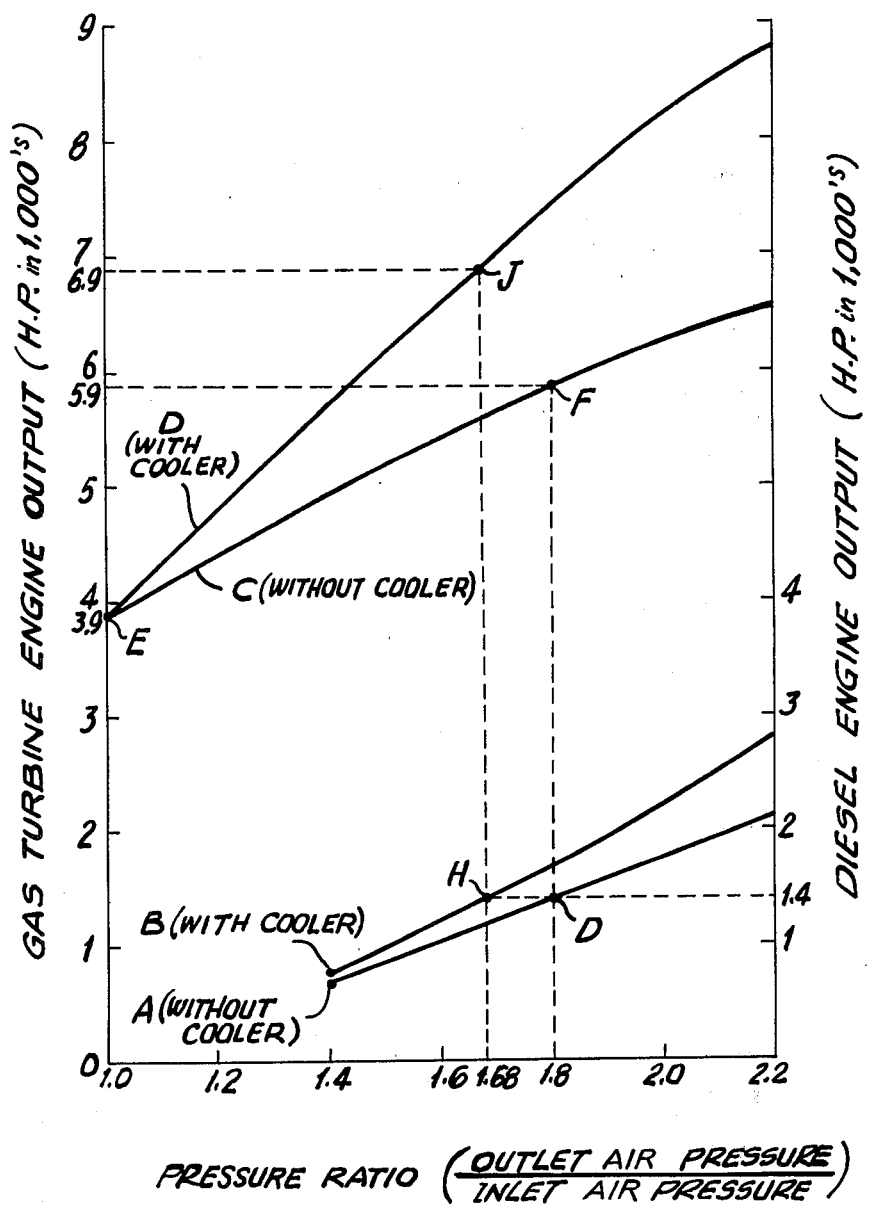
FIG. 3 is a composite graph with the lower curves illustrating the size of the diesel engine necessary to generate a specific compression or pressure ratio, while the upper curves illustrate the horsepower increase of a gas turbine engine based on a given compression ratio.

Referring to FIG. 1, there is illustrated a schematic diagram of the new and improved drive system 10 of the subject invention. The subject invention may be utilized in applications where combined diesel and gas turbine engines have been utilized such as tanks, ships and particularly, patrol vessels. The craft will generally include a rotatable power shaft 20 which is connected to a propeller 22 or other motive means such as a water jet. A diesel engine 24 is provided which is relatively fuel efficient at low power to permit long range missions. In the alternative, a small gas turbine engine, which is also fuel efficient at low power, may be utilized as the main driving engine. The main driving engine typically is designed to produce between 700 and 2000 horsepower and is capable of driving the craft at low cruising speeds.

The craft will also be provided with a gas turbine engine 28 which is used for accelerated combat or flight speeds and is capable of generating between 3000 and 5000 horsepower. The gas turbine engine, while fairly fuel efficient at high speeds, is relatively inefficient at low cruising speeds and therefore is undesirable for use as the main driving engine. Both the diesel 24 and the gas turbine engines 28 are detachably coupled to the shaft 20. As illustrated in FIG. 1, the couplings 30 and 32, respectively, may be a clutch arrangement or any other suitable means which is readily coupled and disengaged.

In accordance with the subject invention, the new and improved drive system 10 further includes a compressor 36 which is detachably coupled to the diesel engine 24 via a coupling 38 or other suitable mechanism. The compressor 36 may be of any conventional type such as an axial or centrifugal compressor. As described more fully hereinbelow, the diesel engine 24 is intended to drive the compressor 36 to pre-compress or supercharge the air supplied to the gas turbine engine 28. The compressor 36 is aerodynamically coupled to the gas turbine engine 28, along channels 40 which preferably include a duct-type arrangement.

In use, a low and mid-range power requirements, the subject drive system is used in a manner similar to the prior art combination drive systems. More specifically, at low cruising speeds only the diesel engine 24 is coupled to the output shaft 20, thereby providing continuous low power with relatively high fuel efficiency. At mid-range speeds, the diesel engine 24 is disengaged from the shaft 20 and the gas turbine engine 26 is coupled thereto instead. In this operating configuration, intake air to the gas turbine does not flow through the compressor 36. As pointed out above, at middle to high range power outputs, the gas turbine engine is relatively fuel efficient. Thus, since a gas turbine engine is substantially quieter than a diesel engine, it is preferable to utilize only the former when circumstances require mid-range power outputs.

In accordance with the subject invention, when maximum power is required such as in combat or emergency situations, the power of the gas turbine engine is boosted by the supercharging compressor. More particularly, to achieve maximum power output, the gas turbine engine 28 is coupled to the shaft 20, while the diesel engine 24 is disengaged from the shaft and is coupled to the compressor 36 such that the horsepower of the diesel engine is used to drive the compressor. The compressor 36 pre-compresses or supercharges the air prior to its being introduced into the gas turbine engine 28 through ducts 40. The compressor functions to increase the air mass flow through the turbine engine which boosts the horsepower generated thereby.

In practice, the increase in horsepower generated by the gas turbine is greater than the horsepower of the diesel engine. Thus, the total horsepower which is delivered to the shaft by the gas turbine engine of the subject invention, is greater than the sum of the maximum horsepower generated by the diesel and gas turbine engines individually. A further advantage of the subject invention is that the total power output is delivered to the shaft through a single coupling 32. In contrast, in the prior art combined systems, the power output of both engines had to be individually coupled to the shaft to deliver maximum power output. As discussed above, coupling two engines, having substantially different performance characteristics, to a single shaft, requires rather sophisticated synchronized gearing and clutch mechanisms. However, in the operation of the subject invention, since maximum output power is generated solely by the gas turbine engine, prior art gear and clutch arrangements are not necessary. Of course, it is to be understood that in the design of military craft it may be desirable to provide the gearing and clutch systems of the prior art, such that the drive system of the subject invention may also be operated in a manner similar to the CODAG systems of the prior art. This redundant arrangement may be desirable as a back-up in case of emergency.

Referring to the graph of FIG. 3, the benefits obtained from the subject invention can be more readily appreciated. In the graph, the horizontal axis represents the compression ratio of the compressor. The pressure ratio is defined as the pressure of the outlet air of the compressor divided by the pressure of the inlet air. Thus, a ratio of 1.0 represents no supercharging, while a ratio of 2.0 represents a doubling of the pressure. The lower curves A and B are associated with the right hand vertical axis and illustrate the amount of diesel engine output horsepower necessary to produce a given pressure ratio. The upper curves C and D are associated with the left hand vertical axis and illustrate the increase in horsepower obtained from a given pressure ratio generated by the compressor.

Referring to curve A, it is apparent that as the output of the diesel engine is increased, from roughly 700 to 2000 horsepower, the pressure ratio generated by the compressor rises from 1.4 to 2.2. For purposes of illustration, a diesel engine capable of generating 1400 horsepower has been selected which correlates to point D on the curve, and which corresponds to a generated pressure ratio of approximately 1.8.

Referring to curve C, there is illustrated the increase in horsepower of a gas turbine engine based on a given pressure ratio. The engine selected is an Avco Lycoming "TF" series engine. The engine has been set to operate at 3900 horsepower, without the benefit of supercharging, as represented by point E on the graph and corresponding to a pressure ratio of 1.0. As the supercharging pressure ratio is increased, the amount of horsepower generated by the engine is also increased along curve C. As shown by the selected example illustrated on the graph, a 1400 horsepower diesel engine will produce a compression pressure ratio of 1.8 (point D). This 1.8 pressure ratio will result in a boost of 2000 horsepower in the turbine engine to a total maximum horsepower of 5900, as seen at point F. In the prior art CODAG system, the maximum horsepower achievable is equal to the sum of the diesel output (1400 HP), plus the gas turbine output (3900 HP) or 5300 horsepower. In contrast, the drive system 10 made in accordance with the subject invention, utilizing the same engines, is capable of generating 5900 horsepower as represented by point F on the graph. Thus, the subject drive system is capable of producing an 11% increase in power over the maximum total available in the prior art CODAG system.

Referring now to FIG. 2, there is schematically illustrated a second embodiment 100 of the drive system of the subject invention. Similar to the first embodiment 10, the second embodiment 100 includes a diesel engine 124 which is detachably coupled to a shaft 120 via coupling 130. A gas turbine engine 128 is also provided which is detachably coupled to the shaft 120 via coupling 132. In accordance with the subject invention, a compressor 136 is detachably coupled to the diesel engine 124 via coupling 138.

As in the first embodiment of the subject invention, in use, the diesel engine 124 is coupled to the shaft and utilized for low power, fuel efficient operation. In midpower ranges, the diesel engine is disengaged and the gas turbine engine is utilized to drive the shaft. When maximum horsepower is necessary, the diesel engine is utilized to drive compressor 136 through coupling 138, to provide a supercharging boost for the gas turbine engine 128. In the second embodiment of the subject invention, a cooling means 150 is also provided for reducing the temperature of the precompressed air prior to its entry into the gas turbine engine 128. The cooling means or intercooler is interconnected between the compressor 136 and the gas turbine engine 128 via ducts 140 and 152, respectively.

Cooling of the pre-compressed air flow functions to increase the density of the flow thereby increasing the mass flow through the gas turbine. Since horsepower increases as a function of mass flow, providing an intercooler, in combination with the subject invention, is highly desirable for a number of reasons. Most importantly, since the primary use of the subject invention is in conjunction with marine vessels, sea water provides a readily available, inexhaustable and low cost cooling medium. In addition, since the temperature of the air flow rises as it is compressed, there is likely to be a rather large temperature difference between the compressed air and the sea water such that a significant amount of cooling can be readily achieved.

The added benefits of providing a cooling means 150 in conjunction with the subject invention is illustrated in the graph of FIG. 3. Referring to curve B, there is illustrated the amount of power which must be generated by the diesel in order to produce a given compression or pressure ratio. In plotting curve B, the outlet air pressure has been measured at the outlet of the cooler since the pressure at the outlet of the compressor, is the same as in curve A. More particularly, when air is cooled, there will be some pressure loss, which is illustrated in curve B. Curve D illustrates the increase in power generated by the gas turbine engine after being supercharged with cooled air having a given pressure ratio.

In order to accurately compare the effects of the cooling means in the subject invention, all the operating parameters of the engines in the first example have been maintained. Thus, a diesel engine generating 1400 horsepower, which in the first embodiment of the subject invention produced a 1.8 pressure ratio, in the second embodiment of the invention produces only a 1.68 pressure ratio, as indicated at point H on the graph. As noted above, the reduction is due to pressure loss in the cooler. However, as can be seen from point J, on curve D, even with a drop in the pressure ratio, the effects of the cooling are such that the gas turbine engine output is equal to 6900 horsepower. As discussed above, without a cooling means, a diesel engine generating 1400 horsepower which is utilized to supercharge a gas turbine engine generating 3900 horsepower will boost its output 5900 horsepower. Thus, the provision of a cooling means results in an additional 1000 horsepower being generated. Comparing the second embodiment of the subject invention to the CODAG system of the prior art, it will be seen that a 1600 horsepower increase is achieved over the maximum 5300 horsepower output of the combined diesel engine (1400 HP), and gas turbine engine (3900 HP) outputs. This corresponds to a 30% increase in power over the prior art CODAG system.

In summary, there is provided a new and improved drive system for supplying power to a shaft which includes in combination a main driving engine and an accelerated driving engine. More specifically, the main driving engine, preferably a diesel or a small gas turbine having high fuel efficiency at lower power, is detachably coupled to the shaft. The accelerated driving engine includes a gas turbine engine, capable of generating high power output, which is detachably coupled to the shaft. In accordance with the subject invention, a compressor is provided which is detachably coupled to the diesel and aerodynamically coupled to the turbine. The compressor is intended to supply compressed air to the turbine for boosting the power generated thereby. In use, the maximum total output power from both engines is achieved by detaching the diesel engine from the shaft and coupling it instead to the compressor. By this arrangement, the diesel engine is used to drive the compressor, with the output of the latter being used to supercharge the turbine, increasing the power generated thereby. The total power achieved in the subject drive system is greater than the sum of the outputs from the individual engines. In addition, complex gearing arrangements necessary to connect both engines to the shaft at the same time, as used in the prior art, are unnecessary. In a second embodiment of the subject invention, a cooling means is interconnected between the compressor and the gas turbine engine. The cooling means functions to reduce the temperature of the compressed air, to produce an increase in density, thereby increasing the mass flow through the turbine, to further increase the power generated thereby.

While the subject invention has been described with reference to preferred embodiments, it will be apparent to one skilled in the art that various changes and modifications may be made thereto without varying from the scope and spirit of the subject invention as defined by the appended claims.

What is claimed is:

1. A drive system for supplying power to a propeller shaft of a ship comprising in combination:
    a main driving engine detachably coupled to said shaft for generating a low power output with high fuel efficiency;
    a gas turbine engine detachably coupled to said shaft, said gas turbine engine generating high power output; and
    a compressor detachably coupled to said main driving engine and fluidly communicating with said gas turbine engine to supply compressed air to the inlet thereof for increasing the power generated by said gas turbine engine, maximum total output power to the shaft being generated by detaching said main driving engine from said shaft and coupling said main driving engine to said compressor such that the power output generated by said main driving engine is utilized to drive said compressor, which functions to supercharge the air input to said gas turbine engine.

2. A drive system as recited in claim 1 wherein said main driving engine is a diesel engine.

3. A drive system as recited in claim 1 wherein said main driving engine is a gas turbine engine.

4. A drive system as recited in claim 1 further including a cooling means utilizing sea water as the cooling medium, operatively interconnected between said compressor and said gas turbine engine, said cooling means adapted to reduce the temperature of said compressed air produced by said compressor prior to entry into the gas turbine engine.

* * * * *